(12) United States Patent
Shoki et al.

(10) Patent No.: US 6,480,526 B1
(45) Date of Patent: Nov. 12, 2002

(54) SPREAD SPECTRUM RECEIVE APPARATUS

(75) Inventors: Hiroki Shoki, Kawasaki (JP); Yasuo Suzuki, Yokohama (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/260,013

(22) Filed: Mar. 2, 1999

(30) Foreign Application Priority Data

Mar. 13, 1998 (JP) .......................................... 10-062622

(51) Int. Cl.$^7$ ................................................ H04L 27/26
(52) U.S. Cl. ......................... 375/147; 375/148; 375/267
(58) Field of Search ................................ 375/147, 140, 375/148, 144, 267, 259, 347, 349, 150, 142, 354, 367; 342/361, 368, 375, 378; 370/208, 320, 334, 335, 342; 455/132, 137, 273, 277.1

(56) References Cited

U.S. PATENT DOCUMENTS

| | | | | |
|---|---|---|---|---|
| 5,481,570 A | * | 1/1996 | Winters ........................ | 375/347 |
| 5,533,011 A | * | 7/1996 | Dean et al. .................. | 370/342 |
| 5,859,842 A | * | 1/1999 | Scott ........................... | 370/342 |
| 5,881,057 A | * | 3/1999 | Komatsu ..................... | 370/335 |
| 6,058,138 A | * | 5/2000 | Fukumasa et al. .......... | 375/130 |
| 6,061,336 A | * | 5/2000 | Baker .......................... | 370/320 |
| 6,081,547 A | * | 6/2000 | Miya ........................... | 370/342 |
| 6,125,109 A | * | 9/2000 | Fuerter ........................ | 370/315 |
| 6,185,408 B1 | * | 2/2001 | Leopold et al. ............. | 455/12.1 |
| 6,229,840 B1 | * | 5/2001 | Ichihara ....................... | 375/147 |
| 6,259,687 B1 | * | 7/2001 | Lomp et al. ................. | 370/334 |

FOREIGN PATENT DOCUMENTS

| | | |
|---|---|---|
| JP | 9-74372 | 3/1997 |
| JP | 9-312885 | 12/1997 |

\* cited by examiner

*Primary Examiner*—Chi Pham
*Assistant Examiner*—Khanh Cong Tran
(74) *Attorney, Agent, or Firm*—Oblon, Spivak, McClelland, Maier & Neustadt, P.C.

(57) ABSTRACT

This invention is a spread spectrum receive apparatus comprising a plurality of receive branches, wherein each of the plurality of receive branches includes at least one antenna which receives a plurality of different polarized components, and a RAKE receiver, commonly prepared for the plurality of receive branches, for modulating the plurality of different polarized components received, and outputting a modulated signal based on the plurality of different polarized components modulated.

11 Claims, 5 Drawing Sheets

SPREAD SPECTRUM RECEIVE APPARATUS

BACKGROUND OF THE INVENTION

The present invention relates to a spread spectrum receive apparatus used for digital cellular mobile communication and the like.

A spread spectrum communication scheme is used as one of the transmission schemes in digital mobile communication using portable telephones and the like. According to the CDMA (Code Division Multiple Access) scheme as a typical scheme of the spread spectrum communication schemes, transmission data is spread-spectrum-modulated with quadrature code sequences to be transmitted, and the data is despread at the receiving end with code sequences identical to those used for spread spectrum modulation so as to extract the original data. This scheme allows multiplexing in code areas by providing different code sequences to different users, and has the advantage of high interference resistance.

Figure 1:
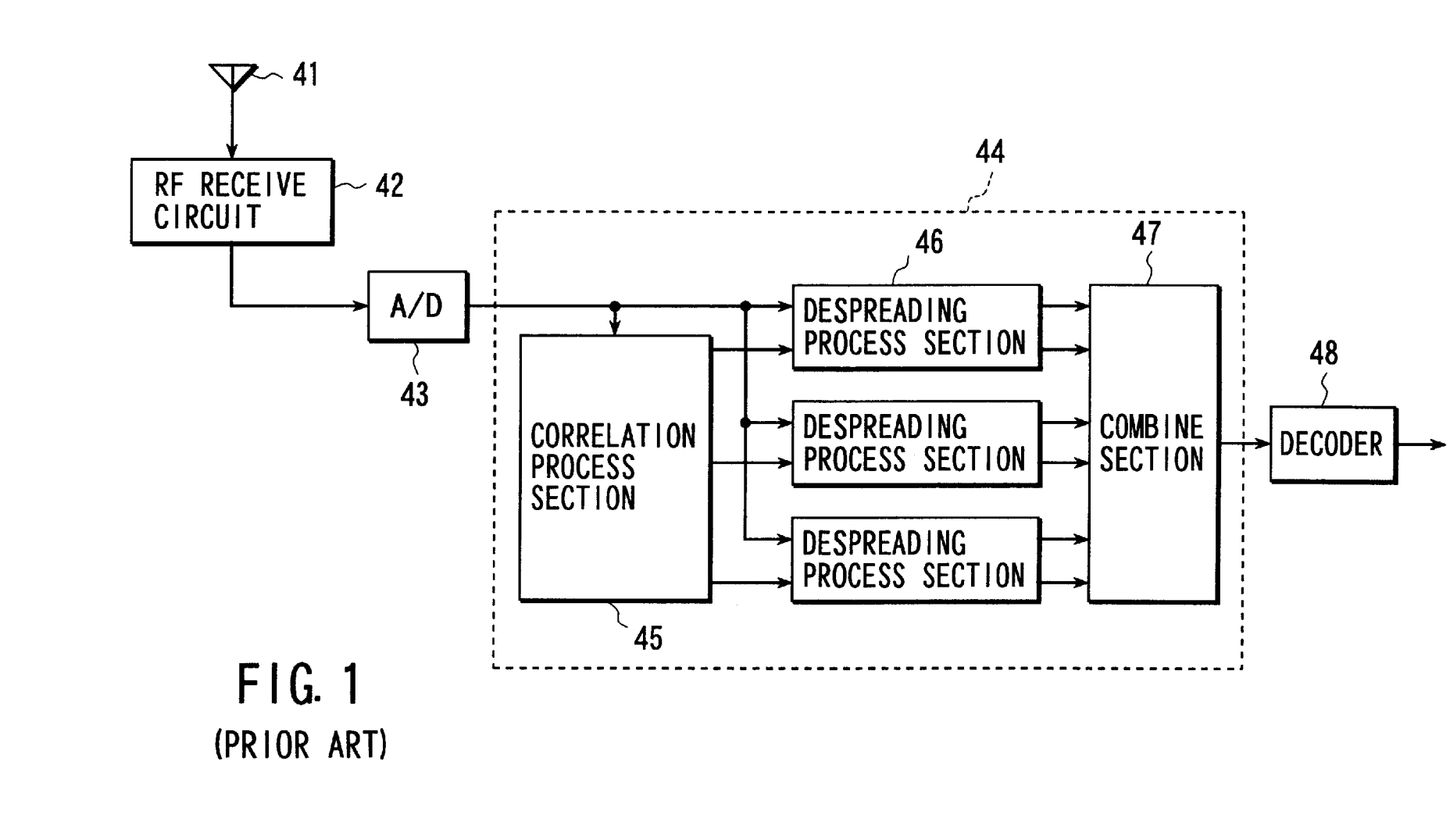
FIG. 1 is a block diagram showing the arrangement of a spread spectrum receive apparatus based on a conventional scheme.

As a receive apparatus used in such a spread spectrum communication scheme, and particularly the CDMA scheme, an arrangement using a RAKE receiver like the one shown in FIG. 1 is known. In this receive apparatus, a signal received by an antenna 41 is subjected amplification, frequency conversion, and the like in a RF receive circuit 42. The resultant signal is converted into a digital signal by an A/D converter 43. This signal is then input to a RAKE receiver 44.

In the RAKE receiver 44, a correlation process section 45 first performs a correlation process for the signal with a known code sequence to estimate a plurality of times at which the maximum correlation on the time axis is provided. A despreading process section 46 then performs a despreading process (a cross-correlation process between the received signal and the known code sequence) for the received signal at each of these maximum correlation times. Subsequently, a combine section 47 performs time correction for the respective output signals from the despreading process section 46 to make them in phase, and combines them to output a demodulated signal.

With the above processing in the RAKE receiver 44, a plurality of delay waves (multipath waves) received by the antenna 41 with different delays can be combined, thus increasing the SNR (signal-to-noise ratio) of the demodulated signal. The demodulated signal output from the RAKE receiver 44 is decoded by a decoder 48. Even in the presence of multipath waves, the original data can be properly regenerated. The RAKE receiver operates very effectively as a receiver for mobile communication in the presence of many multipath waves.

Although a spread spectrum receive apparatus using this conventional RAKE receiver can effectively combine a plurality of multipath waves with different delays, this apparatus cannot properly cope with changes in incoming polarized waves. More specifically, in the actual radio wave propagation environment for mobile communication, the polarized waves of transmitted signals generally change every moment owing to the manners in which users use their terminals and reflection and diffraction on radio wave propagation paths. In many cases, a plurality of multipath waves arriving at the receive apparatus differ in main polarized components. The spread spectrum receive apparatus in FIG. 1 can basically receive only one polarized component, and hence cannot combine a plurality of multipath waves having different main polarized components. Therefore, an increase in SNR of a demodulated signal with the use of a RAKE receiver cannot be expected.

As described above, the spread spectrum receive apparatus using the conventional RAKE receiver cannot properly cope with incessant changes in the polarized waves of incoming waves, and hence cannot combine a plurality of multipath waves having different main polarized components. If polarization diversity is to be used to solve this problem, a plurality of RAKE receivers corresponding to a plurality of polarized components must be prepared, resulting in a complicated, expensive apparatus.

BRIEF SUMMARY OF THE INVENTION

The present invention has been made to solve the above problems, and has as its object to provide a spread spectrum receive apparatus which can realize an increase in SNR with a simple receiver arrangement by combining all received signals even if a plurality of radio waves with different delays and different polarized components are received.

In order to achieve the above object, a spread spectrum receive apparatus according to the present invention comprises a plurality of receive branches, wherein each of the plurality of receive branches includes at least one antenna which receives a plurality of different polarized components; and a RAKE receiver, commonly prepared for the plurality of receive branches, for modulating the plurality of different polarized components received, and outputting a modulated signal based on the plurality of different polarized components modulated.

Since a plurality of different polarized components are received and can be combined by the RAKE receiver, even if a plurality of multipath waves with different polarized components as well as different delays arrive, the multipath waves can be combined. An increase in SNR can therefore be attained by using the RAKE receiver.

More specifically, the RAKE receiver comprises a plurality of correlation process means for performing correlation processes between the respective received signals from the plurality of receive branches and a known code sequence, and estimating a plurality of times at which a maximum correlation is provided on a time axis, a plurality of despreading process means for performing a despreading process for the received signals at the plurality of times estimated by the correlation process means, and combine means, commonly prepared for the received signals from the plurality of receive branches, for performing time correction for output signals from the despreading process means to make the signals in phase, and combining the signals to output a demodulated signal.

With this arrangement, one RAKE receiver can be commonly used for all the receive branches, and there is no need to prepare a plurality of receive systems each including a RAKE receiver as in a case wherein polarization diversity is to be performed. The overall arrangement of the receive apparatus can therefore be greatly simplified.

In addition, this apparatus may include a delay means for setting a relative delay between received signals from the plurality of receive branches. With this arrangement, even if the polarized components received by the respective receive branches have almost the same delay profile, the need for high-precision delay estimation in the RAKE receiver can be eliminated by setting a large delay difference between the polarized components. This facilitates the processing in the RAKE receiver.

Another spread spectrum receive apparatus according to the present invention comprises a plurality of receive branches including an antenna for receiving a plurality of different polarized components, delay means for providing relative delays to received signals from the plurality of receive branches, combine means for combining the received signals from the respective receive branches through the delay means, and a RAKE receiver for receiving a combined received signal output from the combine means and outputting a demodulated signal.

With this arrangement, one RAKE receiver can be commonly used for received signals from the plurality of receive branches to combine the signals. This further simplifies the overall arrangement of the receive apparatus.

In this case, the RAKE receiver comprises correlation process means for performing correlation processes between the combined received signal from the combine means and a known code sequence, and estimating a plurality of times at which a maximum correlation is provided on a time axis, a plurality of despreading process means for performing despreading processes for the combined received signal at the plurality of times estimated by the correlation process means, and combine means for performing time correction for output signals from the despreading process means to make the signals in phase, and combining the signals to output a demodulated signal.

As an antenna for receiving a plurality of different polarized components in the present invention, an antenna may be independently prepared for each polarized component. However, for example, a rectangular patch antenna can be used such that two quadrature linear polarized components or two quadrature circular polarized components are received by this physically single antenna and are separately output.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

The embodiments of the present invention will be described below with reference to the views of the accompanying drawing.

FIRST EMBODIMENT

Figure 2:
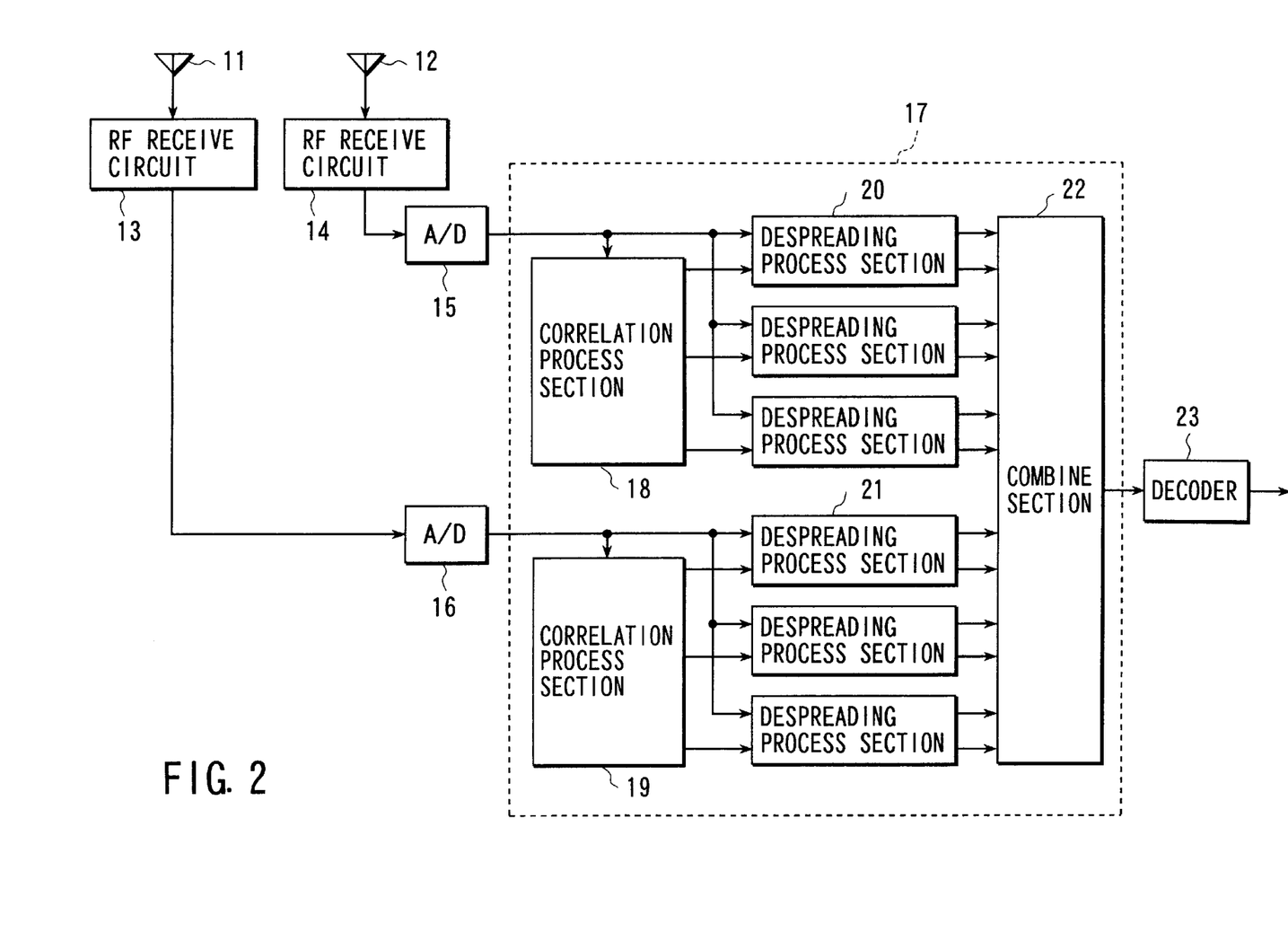
FIG. 2 is a block diagram showing the arrangement of a spread spectrum receive apparatus according to the first embodiment of the present invention.

FIG. 2 shows an example of the arrangement of a spread spectrum receive apparatus according to the first embodiment of the present invention. This spread spectrum receive apparatus is to be installed in a base station or mobile terminal in a mobile communication system such as a digital cellular mobile communication system used for portable telephones or the like. The apparatus is mainly comprised of two antennas 11 and 12, RF receive circuits 13 and 14 respectively connected to the antennas 11 and 12, A/D converters 15 and 16 for converting received signals from the RF receive circuits 13 and 14 into digital signals, a RAKE receiver 17 for receiving the signals output from the A/D converters 15 and 16, and a decoder 23.

In this case, the antennas 11 and 12 have the functions of receiving different polarized components of radio waves arriving at the base station or mobile terminal. For example, the antennas 11 and 12 respectively receive vertical and horizontally polarized waves. Although these antennas 11 and 12 are separately prepared, they may be integrated into one unit, as will be described later.

The received signals of the respective polarized components received by the antennas 11 and 12 are respectively input to the RF receive circuits 13 and 14. For example, the RF receive circuits 13 and 14 amplify the received signals by using low-noise amplifiers (LNAs), select desired frequency components by using bandpass filters (BPFS) or the like, and perform frequency conversion from the radio frequency (RF) band to the intermediate frequency (IF) band or the baseband (BB).

As described above, in this embodiment, the antennas 11 and 12 and the RF receive circuits 13 and 14 connected thereto constitute two receive branches. The received signals from these two receive branches, i.e., the received signals in the IF or BB band output from the RF receive circuits 13 and 14, are respectively converted into digital signals by the A/D converters 15 and 16. The digital signals are then input to the RAKE receiver 17.

The RAKE receiver 17 performs a correlation process, despreading process, and combine process as follows.

First of all, correlation process sections 18 and 19 respectively perform correlation processes between the received signals digitalized by the A/D converters 15 and 16 and output from the respective receive branches and known code sequences called spread codes, thereby estimating a plurality of times at which the maximum correlation is provided on the time axis for each received signal.

Despreading process sections 20 and 21 then respectively perform despreading (cross-correlation between the received signals and the spread codes) processes for the respective received signals from the receive branches at these maximum correlation times. Each of the numbers of despreading process sections 20 and 21 corresponds to the number of delay waves to be combined on the time axis.

Finally, the output signals from the despreading process sections 20 and 21 are subjected to time correction to be made in phase, and are combined by a combine section 22. In this case, all the delay waves corresponding to the received signals from the respective receive branch are combined by the single combine section 22. The output signal from the combine section 22 is the output from the RAKE receiver 17. This output signal is input to the decoder 23 to be decoded. As a result, the original data is regenerated.

In the spread spectrum receive apparatus of this embodiment having the above arrangement, two different polarized components, e.g., horizontal and vertical polarized components, are respectively received by the antennas 11 and 12, and the received signals from the respective receive branches including the antennas 11 and 12 are input to the RAKE receiver 17. With this arrangement, all the desired wave components arriving at the base station or terminal are picked up, and the received waves can be made in phase by delay time correction and combined by the combine section 22 in the RAKE receiver 17. This allows maximization of signal components under a multipath environment, and can increase the SNR of a demodulated signal. In addition, this arrangement provides effective measures against interference waves that interfere with desired wave components.

In addition, since such effects can be obtained by the arrangement using the single RAKE receiver 17, a reduction in cost and simplification of signal processing can be effectively realized.

Furthermore, according to this embodiment, in the RAKE receiver 17, a despreading process is performed for each of the received signals from the plurality of receive branches prepared in units of polarized components, and a combine process based on delay correction is commonly performed for the respective signals by the combine section 22. This allows the use of only one RAKE receiver, and can simplify the arrangement of the receive apparatus and process procedures.

The antennas used in the present invention will be described in detail next.

According to the above description, as a plurality of antennas for receiving different polarized components, the antenna 11 for receiving vertical polarized components and the antenna 12 for receiving horizontal polarized components are used. The polarized components received by the antennas 11 and 12 may be linear or circular polarized waves and are not limited to any specific antenna scheme. The number of antennas is not limited to two, and three or more antennas may be used. In order to obtain the effects of the present invention with the minimum number of antennas, it is preferable that only one antenna be physically used, and two quadrature polarized components be received by the antenna. An example of the arrangement of such an antenna will be described in detail below.

Figure 3A:
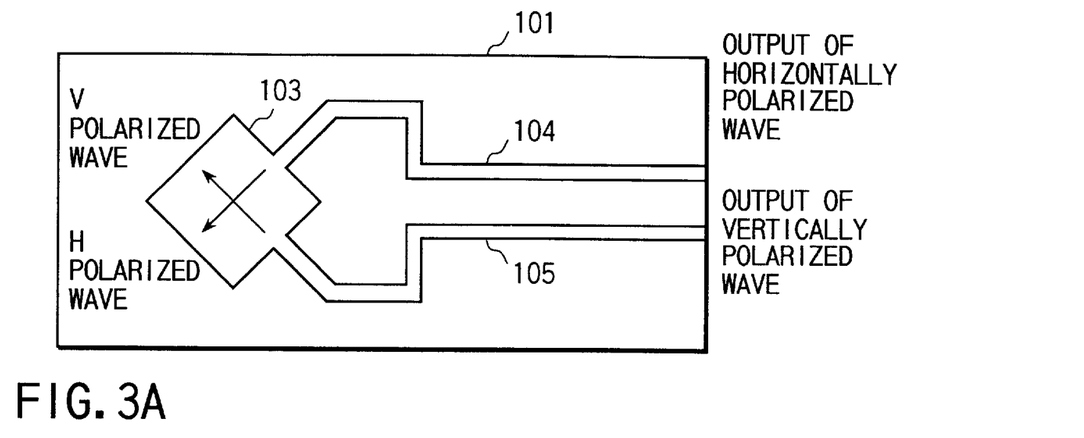
FIGS. 3A and 3B are views showing the arrangement of a linear polarization shared antenna according to this embodiment of the present invention.
Figure 3B:
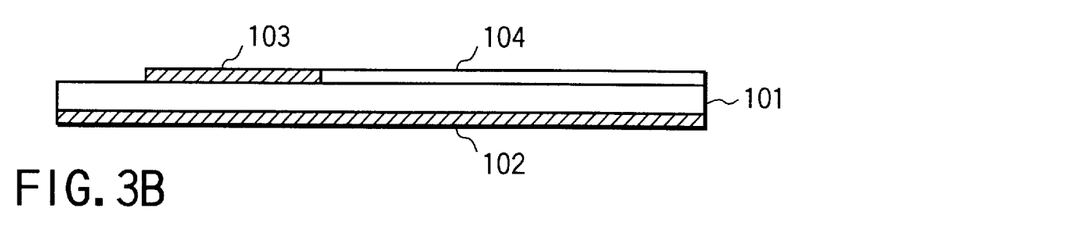

FIGS. 3A and 3B show an example of the arrangement of a linear polarization shared antenna having the function of receiving two quadrature linear polarized components.

This linear polarization shared antenna is comprised of a rectangular patch antenna 103 (also called a microstrip antenna) and microstrip lines 104 and 105 which are formed by, for example, etching a copper film on the upper surface of a dielectric substrate 101 having a ground conductive film 102 formed on its lower surface. The antenna can receive two quadrature linear polarized waves, i.e., a horizontally polarized wave (H polarized wave) and vertically polarized wave (V polarized wave), by properly selecting the feed points of the patch antenna 103. The outputs of H and V polarized waves from the two feed points of the patch antenna 103 are respectively extracted to the output ports through the microstrip lines 104 and 105 and connected to, for example, the RF receive circuits 13 and 14 in FIG. 2.

With the use of this linear polarization shared antenna, since the overall size of the receive apparatus can be reduced, an improvement in portability and a reduction in cost can be effectively attained. In addition, by receiving only two quadrature linear polarized waves, all the received signal powers can be captured regardless of the polarization directions of the received radio waves. This improves the reception efficiency. Such an antenna can be effectively used for mobile communication in the presence of many multipath waves.

Figure 4A:
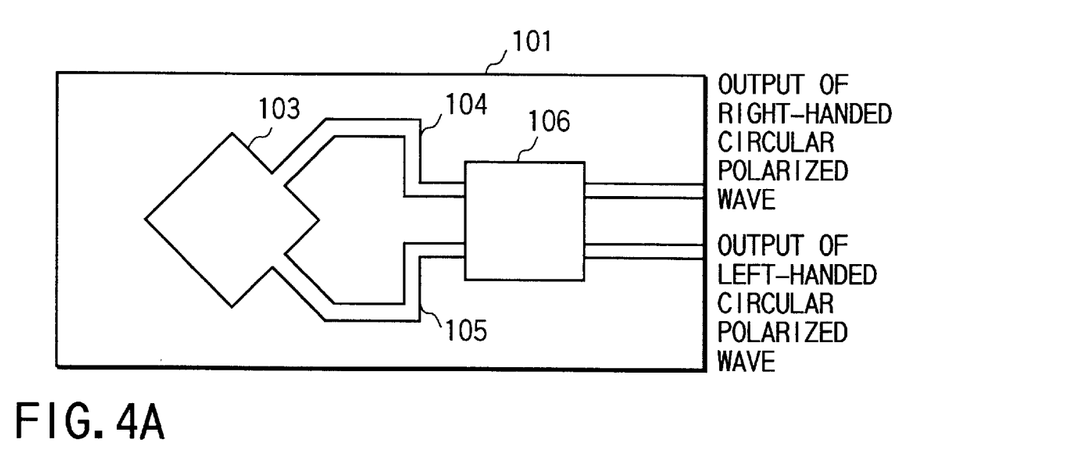
FIGS. 4A and 4B are views showing the arrangement of a circular polarization shared antenna according to this embodiment of the present invention.
Figure 4B:
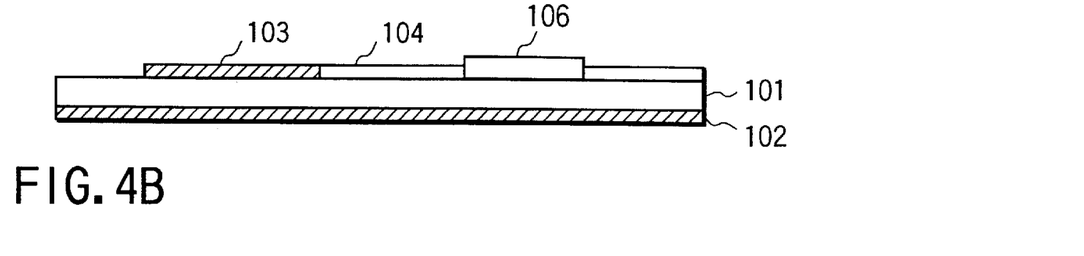

FIGS. 4A and 4B show an example of the arrangement of a circular polarization shared antenna having the function of receiving two quadrature circular polarized components.

The arrangement of this antenna is the same as that of the linear polarization shared antenna in FIGS. 3A and 3B in that a patch antenna 103 and microstrip lines 104 and 105 are formed by, for example, etching a copper film on the upper surface of a dielectric substrate 101 having a ground conductive film 102 formed on its lower surface. The antenna of this embodiment, however, is designed to operate as a circular polarization antenna by setting a phase difference of 90° between the two feed points of the patch antenna 103 which correspond to two quadrature linear polarized waves, and exciting the antenna.

Whether to receive a right-handed circular polarized wave or left-handed circular polarized wave can be controlled depending on how an excitation phase difference of 90° is set between the two feed points, i.e., whether to set +90° or −90°. In the case shown in FIGS. 4A and 4B, with the use of a hybrid circuit (hybrid coupler) 106, both right- and left-handed circular polarized components can be simultaneously output from the output ports. For example, the outputs of right- and left-handed circular polarized waves extracted from the two output ports of the hybrid circuit 106 are connected to the RF receive circuits 13 and 14 in FIG. 2.

The use of this circular polarization shared antenna can reduce the overall size of the receive apparatus and hence can improve the portability, resulting in a cost advantage, as in the case wherein the linear polarization shared antenna in FIGS. 3A and 3B is used. In addition, by receiving only two quadrature circular polarized waves, all the received signal powers can be captured regardless of the polarization directions of the received radio waves. This improves the reception efficiency. Such an antenna can therefore be effectively used for mobile communication in the presence of many multipath waves.

Another advantage of the use of a polarization shared antenna like the one shown in FIGS. 3A and 3B or 4A and 4B in the present invention is its flexibility with respect to polarized waves used in a mobile radio communication system. In Japan, for example, mobile telephone systems use linear polarized waves (V polarized waves, in particular), and satellite mobile communication systems often use circular polarized waves. However, both the types of systems can use either the antenna in FIGS. 3A and 3B or the antenna in FIGS. 4A and 4B as a reception antenna regardless of the type of polarized wave to be used. In other words, a spread spectrum receive apparatus that can be commonly used for a plurality of communication systems using different types of polarized waves can be realized.

SECOND EMBODIMENT

Figure 5:
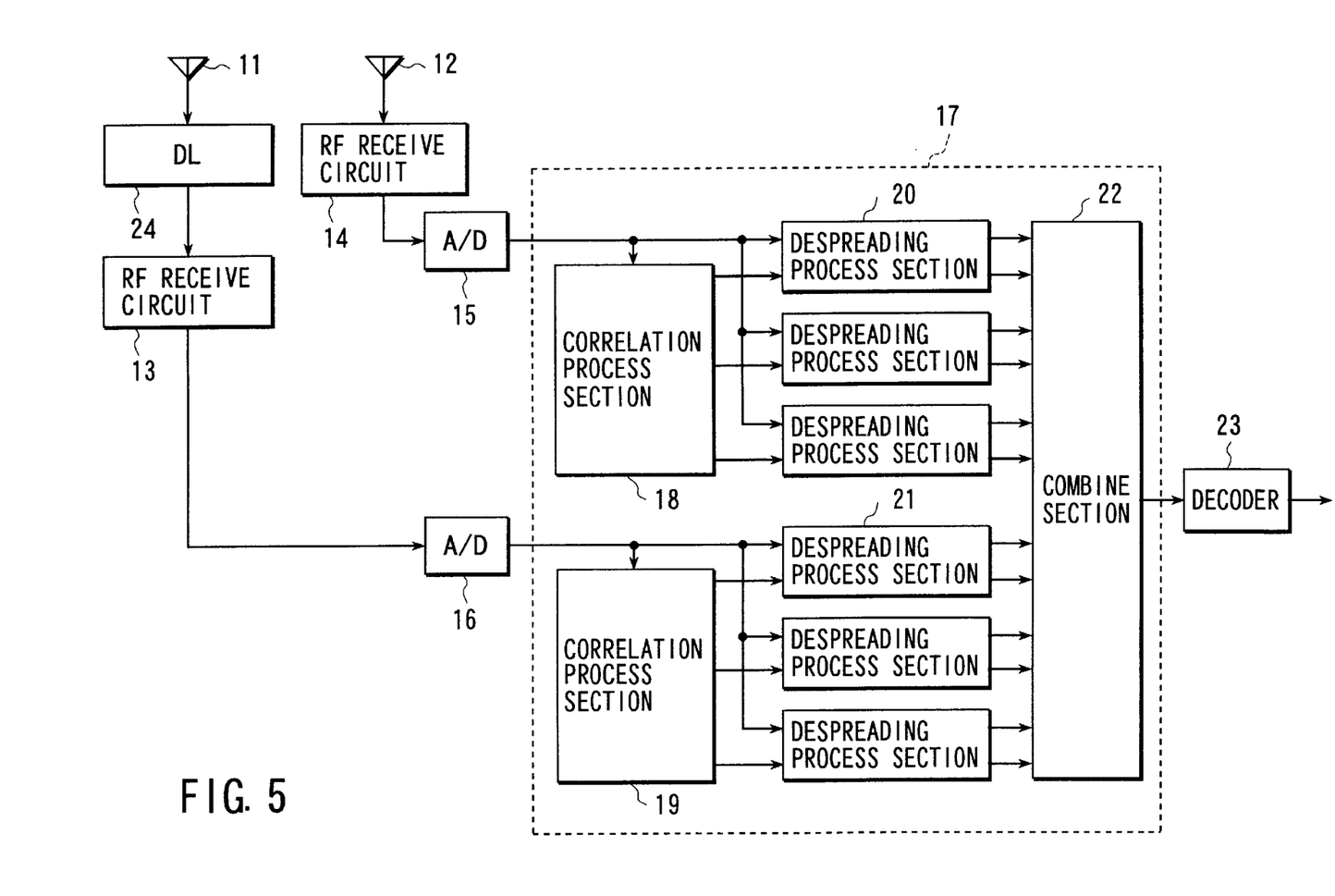
FIG. 5 is a block diagram showing the arrangement of a spread spectrum receive apparatus according to the second embodiment of the present invention.

FIG. 5 shows the arrangement of a spread spectrum receive apparatus according to the second embodiment of the present invention. The same reference numerals in FIG. 5 denote the same parts as in FIG. 2. This embodiment differs from the first embodiment in that as a means for providing a relative delay for received signals from two receive branches constituted by two antennas 11 and 12 and two RF receive circuits 13 and 14, a delay line 24 is inserted between the antenna 11 and the RF receive circuit 13. In place of the delay line 24, a filter or the like that has a much larger electric length may be used.

The advantage of the use of the delay line 24 is that an effective signal combine effect can be obtained even with a decrease in the precision of delays in a despreading process in a RAKE receiver 17. The following is the reason.

In general, the polarized radio waves incident on the antennas 11 and 12 do not perfectly coincide with each other, and intermediate components are received. In this case, the polarized components received by the antennas 11 and 12 have almost the same delay profile, and the delay difference is a small value within 360° at most in terms of a phase amount based on the vector difference between the two polarized components. When, therefore, the RAKE receiver 17 is to perform a despreading process for received signals from the two receive branches and combine the resultant signals upon time correction, a high-precision delay estimation is required for the delay difference between the two receive branches. This demands an increase in integration time (number of times) and a complicated despreading process.

In contrast to this, if the delay line 24 is inserted in one of the two receive branches as in this embodiment, since received signals from these receive branches have totally difference delay profiles, signals can be properly combined without any high-precision delay estimation in the RAKE receiver 17.

Although this embodiment uses the delay line 24, a filter or the like that has a much larger electric length can be used in place of the delay line 24. In addition, since it suffices if a relative delay difference is set between received signals from the two receive branches, the delay means can be inserted in either of the receive branches. In some case, delay means with different delays may be inserted in both the receive branches.

THIRD EMBODIMENT

Figure 6:
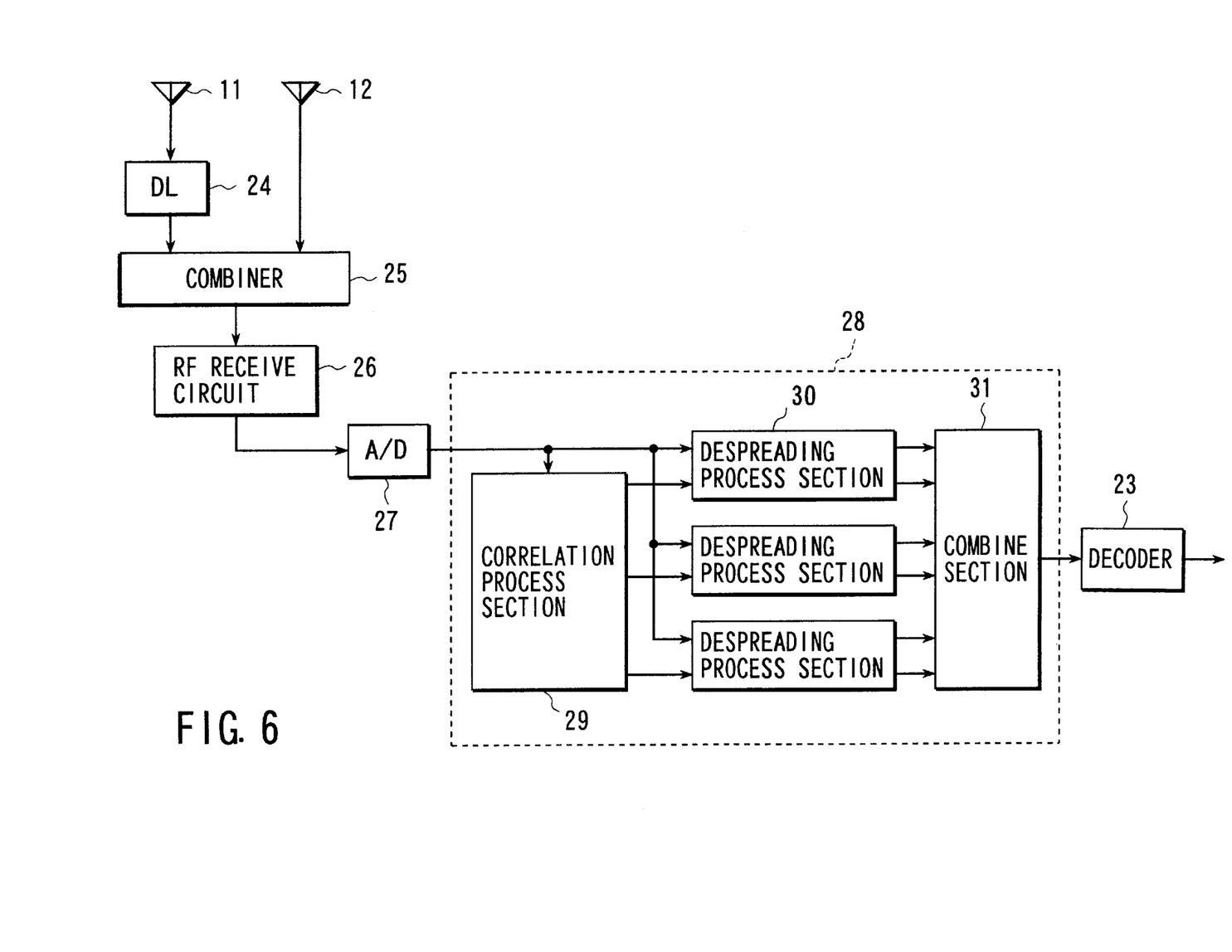
FIG. 6 is a block diagram showing the arrangement of a spread spectrum receive apparatus according to the third embodiment of the present invention.

FIG. 6 shows the arrangement of a spread spectrum receive apparatus according to the third embodiment of the present invention. The same reference numerals in FIG. 6 denote the same parts as in FIG. 5. In this embodiment, a delay line 24 is inserted in one of two receive branches including antennas 11 and 12, a combiner 25 combines received signals from the two receive branches in an analog signal area, e.g., the RF band, and the RF receive circuit and the subsequent circuits are shared by the two receive branches. This embodiment has the same arrangement as that of the second embodiment except for this characteristic feature.

The combined received signal from the combiner 25 is converted into a digital signal by an A/D converter 27. This digital signal is input to a RAKE receiver 28. The RAKE receiver 28 performs the same process as that described above by using a correlation process section 29, a despreading process section 30, and a combine section 31.

According to this embodiment, received signals from the two receive branch are combined in the analog signal area, and the RF receive circuit and the RAKE receiver are shared by the two receive branches, thereby simplifying the arrangement of the receive apparatus. Therefore, the number of expensive components such as amplifies, in particular, can be decreased, resulting in a great reduction in the overall cost of the apparatus.

When received signals from the two receive branches are to be combined by the combiner 25, a delay means for setting a relative delay difference between the received signals from the two receive branches, like the delay line 24, must be placed before the combiner 25. If the received signals from the two receive branches are simply combined without using such a delay means, the two polarized components are combined in phase, resulting in loss of the effect obtained by receiving a plurality of different polarized components.

As has been described above, according to the present invention, with a plurality of receive branches including antennas that can receive a plurality of difference polarized components, all the desired wave components of radio waves arriving at the base station or terminal can be picked up, and can be combined in phase by the RAKE receiver regardless of the polarization of the incoming radio waves and delay times.

Signal components can therefore be maximized even under a communication environment including a plurality of multipath waves with different delays and in different polarized states. An increase in SNR can be expected. Furthermore, this arrangement is also effective as a measure against interference waves that interfere with desired wave components.

In addition, unlike a scheme using polarization diversity, the present invention can obtain the above effects with the arrangement using only one RAKE receiver. This can effectively attain a reduction in cost and simplification of signal processing.

The utility value of the spread spectrum receive apparatus of the present invention is therefore very high as a receive apparatus used in a terminal or base station in digital mobile communication.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A spread spectrum receive apparatus comprising:
   a plurality of receive branches respectively configured to receive a plurality of different polarized components with each other;
   A/D converters configured to convert the received plurality of different polarized components which are directly received from the plurality of receive branches to digitalized plurality of different polarized components, respectively;
   a RAKE receiver, commonly prepared for said plurality of receive branches, configured to demodulate the digitalized plurality of different polarized components which is directly received from the A/D converters, and to output a demodulated signal based on the plurality of different polarized components demodulated; and
   a delay device configured to delay at least one of the plurality of different polarized components from said plurality of receive branches to the RAKE receiver.

2. An apparatus according to claim 1, wherein said RAKE receiver comprises:
   a first section for performing correlation processes between the digitalized respective plurality of different polarized components and a known code sequence, thereby estimating a plurality of times at which a maximum correlation is provided on a time axis;
   a second section for performing a despreading process for the digitalized respective plurality of different polarized components received at the plurality of times estimated; and a third section, commonly prepared for tile respective plurality of different polarized components received, for making the respective plurality of different polarized components despreaded in phase, and combining the respective plurality of different polarized components made in phase to output the demodulated signal.

3. An apparatus according to claim 1, wherein the plurality of receive branches correspond to an antenna which receives two quadrature linear polarized components and separately outputs the components.

4. An apparatus according to claim 1, wherein the plurality of receive branches correspond to an antenna which receives two quadrature circular polarized components and separately outputs the components.

5. An apparatus according to claim 3, wherein the antenna is a microstrip antenna.

6. An apparatus according to claim 4, wherein the antenna is a microstrip antenna.

7. A spread spectrum receive apparatus comprising:

a plurality of receive branches, wherein each of the plurality of receive branches includes an antenna configured to receive a plurality of different polarized components with each other;

at least one delay device configured to delay at least one of the plurality of different polarized components received from said plurality of receive branches;

a combiner configured to combine the plurality of different polarized components received including said at least one of the plurality of different polarized components delayed and to output the plurality of different polarized components combined;

a receive circuit configured to amplify the plurality of different polarized components output; and a RAKE receiver configured to output a demodulated signal based on the plurality of different polarized components combined.

8. An apparatus according to claim 7, wherein said RAKE receiver comprises:

a first section for performing correlation processes between the plurality of different polarized components combined and a known code sequence, thereby estimating a plurality of times at which a maximum correlation is provided on a time axis;

a second section for performing a despreading process for the plurality of different polarized components combined at the plurality of times estimated; and a third section for making the plurality of different polarized components despreaded in phase, and combining the plurality of different polarized components made in phase to output the demodulated signal.

9. An apparatus according to claim 7, wherein said one antenna receives two quadrature linear polarized components and separately outputs the two quadrature linear polarized components.

10. An apparatus according to claim 7, wherein said one antenna receives two quadrature circular polarized components and separately outputs the two quadrature circular polarized components.

11. An apparatus according to claim 7, wherein the antenna is a microstrip antenna.

* * * * *